UNITED STATES PATENT OFFICE.

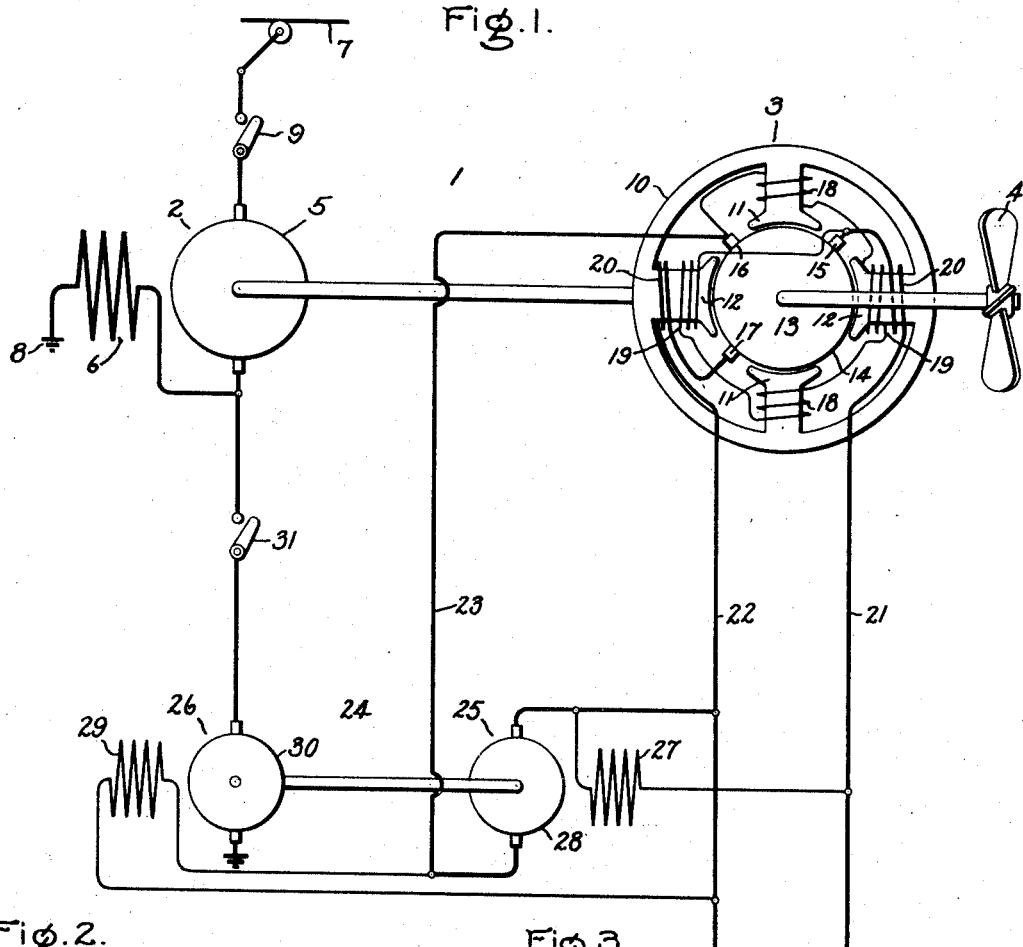

WILLIAM B. POTTER, OF SCHENECTADY, NEW YORK, ASSIGNOR TO GENERAL ELECTRIC COMPANY, A CORPORATION OF NEW YORK.

SPEED-REGULATING SYSTEM FOR MOTOR-GENERATOR SETS.

1,315,793.   Specification of Letters Patent.   Patented Sept. 9, 1919.

Application filed December 17, 1917. Serial No. 207,515.

*To all whom it may concern:*

Be it known that I, WILLIAM B. POTTER, a citizen of the United States, residing at Schenectady, in the county of Schenectady, State of New York, have invented certain new and useful Improvements in Speed-Regulating Systems for Motor-Generator Sets, of which the following is a specification.

My invention relates to a speed regulating system for motor generator sets and particularly to a speed regulating system for motor generator sets, the load on which or the voltage applied to which, or both said load and voltage, are variable.

For the most satisfactory operation of the generator of a motor generator set and for the best efficiency of the set, it is desirable that the speed thereof be maintained approximately constant notwithstanding variation in the voltage applied to the motor and notwithstanding variation in the load on the motor. In many instances, furthermore, a blower is connected to, and constitutes a part of, the motor generator set and since the power required to drive a blower varies as a function of the speed, increasing very rapidly as the speed increases, a considerable saving in the power consumed by the motor may be effected if the speed of the motor be maintained approximately constant at the minimum speed essential for the desired blower and generator operation.

The object of my invention, therefore, is to provide an improved system for regulating the speed of a motor generator set and maintaining it approximately constant notwithstanding fluctuations in the voltage applied to the motor and notwithstanding variations in the load on the motor.

In accordance with my invention I employ means, comprising an auxiliary motor generator set electrically interposed between the generator and the motor of the main motor generator set, for varying the field excitation of the motor of the main motor generator set in response to variations in its speed in such a manner that the field excitation varies at a greater rate than the speed of the main motor generator set.

My invention may be best understood by reference to the following specification and the accompanying drawing, in Figure 1 of which is diagrammatically shown one embodiment of my invention; in Fig. 2 of which are shown curves indicating the relation between the flux in certain parts of the generator of the main motor generator set, illustrated in Fig. 1, and the speed thereof; and in Fig. 3 of which are shown curves indicating the relation between the voltage between different groups of the brushes of the generator of the main motor generator set, illustrated in Fig. 1, and the speed thereof.

Referring to Fig. 1, 1 represents a main motor generator set comprising a series motor 2, a generator 3 and a blower 4. The motor 2 comprises an armature 5 and a field winding 6 which may be connected in series across the supply circuit comprising the trolley line 7 and ground 8, by means of the switch 9. The generator 3, which is described and claimed in the co-pending application of Sven Bergman, Serial No. 112,940, filed August 3, 1916, comprises a field magnet structure 10, having two sets of field poles 11 and 12, and an armature 13, having a commutator 14. Brushes or sets of brushes, 15, 16 and 17 bear upon the commutator 13. In that portion of the armature between brushes 15 and 16 there is developed a voltage due to the flux set up by field poles 11 and between the brushes 16 and 17 there is developed a voltage due to the flux set up by field poles 12. The voltage between brushes 15 and 17 is, therefore equal to the algebraic sum of the voltage devedoped between brushes 15 and 16 and the voltage developed between brushes 16 and 17. The polarities of the field poles 11 and 12 are chosen so that the voltage between brushes 15 and 17 is equal to the arithmetical difference between the voltage across brushes 15 and 16 and the voltage across brushes 16 and 17. The field poles 11 and 12 are provided with windings 18 and 19 which, as illustrated, are connected in series across the brushes 15 and 16. The field poles 11 are operated practically saturated over the speed range for which the generator 3 is designed so that the voltage developed between the brushes 15 and 16 will vary approximately as the speed of the generator. The variation of the flux in the field poles 11 with variations in speed is represented by curve A of Fig. 2 and the variation of the voltage between brushes 15 and 16 with variations in speed is represented by curve C of Fig. 3. The field poles 12, on the other hand, are operated unsaturated over the speed range for which the generator 3 is designed so that the voltage developed between brushes 16 and 17 will vary approximately as the square of the speed of the generator. The variation of the flux in the field poles 12 with variations in speed is represented by curve B of Fig. 2 and the variation of the voltage between brushes 16 and 17 with variations in speed is represented by curve D of Fig. 3. The voltage between brushes 15 and 17, being the arithmetical difference between the voltage between brushes 15 and 16 and the voltage between brushes 16 and 17, will remain approximately constant and is represented by curve E of Fig. 3.

The brushes 15 and 17 are connected in series with windings 20, mounted upon the field poles 12, to the conductors 21 and 22. The windings 20 enable the desired compensation and compounding to be secured. The brush 16 is connected to the conductor 23. It is, therefore, evident that the voltage across conductors 21 and 22 remains approximately constant, notwithstanding variation in the speed of the motor generator set 1, and that the voltage across conductors 22 and 23 varies as the square of the speed of the motor generator set 1.

An auxiliary motor generator set 24, comprising a motor 25 and a generator 26, is electrically interposed between the generator 3 and the motor 2 in order to regulate the speed of the motor generator set. The motor 25 has a field winding 27 connected across the conductors 21 and 22 and an armature 28 connected across the conductors 22 and 23. The generator 26 has a field winding 29 connected across the conductors 22 and 23 and an armature 30 which may be connected in shunt to the field winding 6 of the motor 2 by means of switch 31. The generator 26 is designed to operate unsaturated.

The operation of the system embodying my invention, as at present understood, is as follows:

Assume the switches 9 and 31 to be closed, the main motor generator set 1 to be operating at the desired speed and the motor generator set 24 also to be running. By reason of the fact that the field winding 27 of the motor 25 is connected across the conductors 21 and 22 and is, therefore, subjected to a voltage which remains approximately constant notwithstanding variations in the speed of the generator 3, the armature 28 of the motor 25 and the field winding 29 of the generator 26 are connected across the conductors 22 and 23 and are, therefore, subjected to a voltage which varies as the square of the speed of the generator 3, and the generator 26 operates unsaturated, the armature 30 of the generator 26 will impress a voltage upon the field winding 6 of the motor 2 which varies approximately as the fourth power of the speed of the motor generator set 1. Therefore, if for any reason, such as an increase in the voltage of the supply circuit or a decrease in the load, the speed of the motor generator set 1 tends to increase, the field of the motor 2 will be strengthened due to the increase of the voltage impressed thereon by the generator 26 so as to limit the increase in speed of the motor generator set 1 to a small amount and, likewise, if for any reason, such as a decrease in the voltage of the supply circuit or an increase in the load, the speed of the motor generator set 1 tends to decrease the field of the motor 2 will be weakened due to the decrease in the voltage impressed thereon by the generator 26 so as to limit the decrease in the speed of the motor generator set 1 to a small amount. Hence, although some variation in the speed of the motor generator set 1 is necessary to effect the regulation of the speed thereof nevertheless the effect of the variation in the speed of the motor generator set 1 is multiplied to such an extent by the generator 3 and the motor generator set 24 that the speed of the motor generator set 1 is maintained approximately constant notwithstanding variations in the voltage of the supply circuit and notwithstanding variations in the load.

I conceive that various modifications of my invention may be made and I accordingly do not desire to be limited to the exact arrangement shown, but seek to cover in the appended claims any such modifications and arrangement as fall within the scope and spirit of my invention.

What I claim as new and desire to secure by Letters Patent of the United States, is:

1. In combination, a supply circuit, a main motor generator set comprising a motor, provided with an armature connected to said supply circuit and a field winding, and a generator arranged to deliver a voltage which varies with its speed, and an auxiliary motor generator set comprising a motor electrically connected to the generator of the main motor generator set, and a generator electrically connected to said field winding, and arranged to impress upon said field winding in response to variations in speed of the main motor generator set a voltage which varies at a greater rate than the speed of the main motor generator set.

2. In combination, a supply circuit, a main motor generator comprising a motor, provided with an armature connected to said supply circuit and a field winding, and a generator arranged to deliver a voltage which varies at a greater rate than the speed of the main motor generator set, and an auxiliary motor generator set comprising a motor electrically connected to the generator of the main motor generator set, and a generator connected to be excited by said voltage and to impress upon said field winding in response to variations in speed of the main motor generator set a voltage which varies at a greater rate than the speed of the main motor generator set.

3. In combination, a supply circuit, a main motor generator set comprising a motor, provided with an armature connected to said supply circuit and a field winding, and a generator arranged to deliver a voltage which varies with its speed, and an auxiliary motor generator set comprising a motor having an armature connected to receive said voltage, and a generator connected to be excited by said voltage and to impress upon said field winding in response to variations in speed of the main motor generator set a voltage which varies at a greater rate than the speed of the main motor generator set.

4. In combination, a supply circuit, a main motor generator set comprising a motor connected to said supply circuit and a generator adapted to deliver a voltage which varies with its speed and a voltage which remains approximately constant as its speed varies, and an auxiliary motor generator set comprising a motor, having an armature connected to receive said first named voltage and a field winding connected to receive said second named voltage, and a generator having a field winding connected to receive said first named voltage and an armature connected to impress its voltage upon a field winding of the motor of said main motor generator set.

5. In combination, a variable voltage supply circuit, a main motor generator set comprising a blower, a motor provided with a series field winding and connected to said supply circuit, and a generator adapted to deliver a voltage which varies approximately as the square of its speed and a voltage which remains approximately constant as its speed varies, and an auxiliary motor generator set comprising a motor, having an armature connected to receive said first named voltage and a field winding connected to receive said second named voltage, and an unsaturated generator having a field winding connected to receive said first named voltage and an armature connected to impress its voltage upon said series field winding.

In witness whereof, I have hereunto set my hand this 14th day of Dec., 1917.

WILLIAM B. POTTER.